United States Patent [19]

Finnegan

[11] Patent Number: 4,699,674
[45] Date of Patent: Oct. 13, 1987

[54] THERMAL TREATMENT OF BRAZED PRODUCTS FOR IMPROVED CORROSION RESISTANCE

[75] Inventor: Walter D. Finnegan, Walnut Creek, Calif.

[73] Assignee: Kaiser Aluminum & Chemical Corporation, Oakland, Calif.

[21] Appl. No.: 840,835

[22] Filed: Mar. 18, 1986

[51] Int. Cl.$^4$ .................................................. C22F 1/04
[52] U.S. Cl. ..................................... 148/127; 148/437; 148/438; 148/439; 148/440
[58] Field of Search ............... 148/127, 437, 438, 439, 148/440

[56] References Cited

U.S. PATENT DOCUMENTS 4,035,201 7/1977 Anderson et al. .................. 148/127

Primary Examiner—R. Dean
Attorney, Agent, or Firm—Andrew E. Barlay

[57] ABSTRACT

Corrosion resistance in a brazed aluminum product is improved by subjecting the product to a heat treatment at a temperature of 300° F. to 800° F. for at least about one hour, preferably preceded by cooling the product to a temperaure below the temperature ultimately selected for the treatment, and in any event below about 550° F. The useful life of brazed products such as automotive radiators is increased several times as a result of this treatment.

28 Claims, No Drawings

THERMAL TREATMENT OF BRAZED PRODUCTS FOR IMPROVED CORROSION RESISTANCE

BACKGROUND OF THE INVENTION

This invention relates to brazed aluminum products, and particularly to the behavior of such products when exposed to corrosive environments.

Brazing is a widely used process for joining aluminum parts in the manufacture of such products as air conditioning evaporators and radiators. In use, these products, particularly automotive radiators, are exposed to salted road splash causing intergranular corrosion attack, which limits the useful life of the product.

This problem has been addressed in the literature in a variety of ways. An early example is Miller, U.S. Pat. No. 2,821,014 (Jan. 28, 1958), where it is disclosed that intergranular corrosion problems in flux and dip brazing are alleviated by adding an interlayer between the structural member portion and the brazing layer. The interlayer is aluminum or an aluminum-base alloy, particularly certain magnesium-containing alloys, having a melting point greater than that of the structural alloy. The solution offered by Singleton et al., U.S. Pat. No. 3,788,824 (Jan. 29, 1974) and its divisional, U.S. Pat. No. 3,881,879 (May 6, 1975), is directed to vacuum brazing, and involves the addition of iron to either the core alloy or the cladding alloy as an alloying element, resulting in improvements in both corrosion resistance and sag resistance. Anthony et al., U.S. Pat. No. 4,039,298 (Aug. 2, 1977) address both flux and vacuum brazing, and disclose a composite of complex and highly specified composition as being particularly beneficial in terms of corrosion properties. The disclosed core alloy contains specified amounts of manganese, copper, chromium, silicon and iron as alloying elements with both a solid solution and an alpha-phase, whereas the alloying elements in the cladding are bismuth and silicon. An additional disclosure by the same patentees appears in U.S. Pat. No. 4,093,782 (June 6, 1978) and its continuation-in-part, U.S. Pat. No. 4,167,410 (Sept. 11, 1979), in which the core alloy contains a specified combination of chromium and manganese, with resultant improvements in both corrosion resistance and sag resistance. A similar disclosure appears in Setzer et al., U.S. Pat. No. 3,994,695 (Nov. 30, 1976), where the core alloy contains a chromium-manganese-zirconium combination, the sole claimed benefit however being an improvement in sag resistance. A combination of copper and titanium as primary alloying elements in the core alloy is disclosed in Kaifu et al., U.S. Pat. No. 4,339,510 (July 13, 1982), as providing a benefit in intergranular corrosion resistance.

A different approach is disclosed by Nakamura, U.S. Pat. No. 4,172,548 (Oct. 30, 1979), in which corrosion following fluxless brazing processes in general (including both vacuum brazing and brazing in an inert atmosphere) is controlled by controlling the grain size of the brazing sheet to at least 60 microns in diameter, achieved by a controlled cold work followed by a full anneal.

Heat treatment is disclosed for metallic alloys in general for a number of reasons. Heat treatment after brazing in a heat-hardenable copper-based alloy is disclosed by Silliman, U.S. Pat. No. 2,117,106 (May 10, 1938) for returning hardness and spring qualities lost during the brazing procedure. Soldered joints in copper-brass radiators are heat-treated in a process disclosed by Harvey, U.S. Pat. No. 3,335,284 (Nov. 28, 1967) to lessen the occurrence of stress and creep-rupture at the operating temperature. Tisinai, et al., U.S. Pat. No. 3,028,268 (Apr. 3, 1962) used a high temperature heat treatment to impart corrosion resistance to nickel-chromium-molybdenum alloys. Heat treatments are disclosed for similar purposes in aluminum wires (Weber, U.S. Pat. No. 3,503,596, Mar. 31, 1970) and zinc-based alloys (Gervais, et al., U.S. Pat. No. 3,880,679, Apr. 29, 1975).

SUMMARY OF THE INVENTION

It has now been discovered that the heightened corrosion susceptibility in aluminum alloy products brought about by brazing processes can be reduced by a post-brazing heat treatment at a temperature below that which causes solution heat treatment. The treatment has the capacity of increasing the useful life of a brazed product several-fold, and is particularly unusual and unexpected when applied to brazed products made from a non-heat-treatable core material.

DETAILED DESCRIPTION OF THE INVENTION AND PREFERRED EMBODIMENTS

The duration and intensity of the heat treatment in accordance with the present invention are interdependent in a reciprocal manner. Thus, as higher temperatures are used, equivalent results may be obtained in lesser times, and vice versa. With these considerations in mind, the parameters of the treatment may be varied widely. In general, however, the temperature is kept below that at which solution heat treatment is known to occur for the particular core alloy used in the product. Best results will generally occur at temperatures ranging from about 300° F. (150° C.) to about 800° F. (430° C.), preferably from about 450° F. (230° C.) to about 650° F. (345° C.).

In the broadest sense, the length of time during which the product is held at the treatment temperature may range from a fraction of an hour up to several days. The time requirement for any particular desired result will vary with the treatment temperature. At treatment temperatures less than about 400° F. (204° C.), best results will be obtained in treatments lasting at least about 20 hours; while at temperatures of about 400° F. (204° C.) to about 500° F. (260° C.), the time period for comparable results is at least about 10 hours; and above about 500° F. (260° C.), the time period may be as low as about 25 minutes. In preferred embodiments of the invention, the treatment is done at a temperature of about 450° F. (230° C.) to about 650° F. (345° C.) for at least about two hours, with commercially useful results generally occurring in less than ten hours. The pressure maintained during the treatment may vary widely; atmospheric pressure is sufficient.

Since the heat treatment is well below the brazing temperature range, cooling will be required between the two procedures. Beneficial results will generally be obtained, regardless of whether the cooling is done quickly or gradually. The preferred method, however, is to cool the brazed product to a temperature well below the heat treatment temperature, then raise the temperature back to the desired level. Beneficial effects will thus result by lowering the temperature to about 550° F. (288° C.) or less, preferably about 350° F. (177° C.) or less, in this intermediate stage.

The process of the invention is applicable to brazed products in general, with particular utility in connection with vacuum-brazed products. The process is preferably applied to products formed from non-heat-treatable core alloys, preferably those of the 3×X× series of alloys as designated by the Aluminum Association. Examples are the 3003, 3005, and 3105 alloys, including modified versions of these alloys. Products of particular interest are also those having cladding or brazing alloys which contain silicon as the primary alloying element. Exemplary such alloys are those of the 4×X× series, notably the 4003, 4043, 4045, 4047, 4104 and 4343 alloys, including modified versions of these alloys.

The following examples are offered for purposes of illustration only, and are intended neither to define nor limit the invention in any manner.

EXAMPLE 1

A brazing sheet of the following composition was cut into pieces measuring 2-3/16 in. (5.56 cm) by 4¾ in. (12.06 cm) by 0.0206 in. (0.052 cm) thick:

TABLE 1.1

| TEST MATERIALS | | |
|---|---|---|
| Core Alloy | | Cladding Alloy (12% Both Sides) |
| Element | Weight % | Weight % |
| Si | 0.14 | 11.7 |
| Fe | 0.49 | 0.3 |
| Cu | 0.10 | 0.05 |
| Mn | 1.12 | 0.01 |
| Mg | 0.56 | 0.19 |
| Cr | 0.007 | 0.002 |
| Zn | 0.07 | 0.03 |
| Ti | 0.019 | 0.027 |
| Al | balance | balance |

A simulated brazing procedure was performed by suspending the pieces upright in a vacuum furnace where they were heated to 1100° F. (593° C.) at a pressure of $1 \times 10^{-5}$ torr in fifteen minutes and held at temperature for two minutes. The pieces were then withdrawn from the furnace and cooled in air. Some of the pieces were then given a post-braze thermal treatment in accordance with the present invention by being heated to 350° F. (177° C.) at atmospheric pressure for varying lengths of time.

All pieces were then cut to fit into a leak test device, and one side of each was masked with electroplater's tape. The pieces were then corrosion tested in the device according to ASTM Procedure No. G43 in a 98% humid atmosphere by intermittent exposure to an atomized solution consisting of (on weight basis):

TABLE 1.2

| CORROSION SOLUTION | |
|---|---|
| Component | Amount |
| Synthetic sea salt | 42 g/liter |
| Glacial acetic acid | 10 ml/liter |
| Water | balance | for extended periods of time. This is a procedure which is known in the aluminum industry for its ability to duplicate the intergranular mode of corrosion observed in automotive radiators retrieved from field service.

During exposure to the corrosion solution, the pieces were monitored daily for the development of blisters on the taped side indicating perforation of the pieces by corrosion. The results are shown in Table 1.3.

TABLE 1.3

| BLISTER TEST RESULTS | | |
|---|---|---|
| Post-braze Treatment (Hours at 350° F.) | Hours Exposure to Corrosion Solution | Appearance of Taped Side |
| 4 | 48 | blisters |
| 8 | 48 | blisters |
| 24 | 48 | no blisters |
| 24 | 160 | blisters |
| 74 | 160 | no blisters |
| 74 | 600 | blisters |

Summarizing this table, corrosion resistance improved as the post-braze treatment was extended from 4 to 24 hours (based on a 48-hour corrosion test), and again from 24 to 74 hours (based on a 160-hour corrosion test). The point where blisters (i.e., perforation due to corrosion) did appear on a sample which had been given a 74-hour post-braze treatment at 350° F. was between 160 and 600 hours' exposure to the corrosion solution.

The tape was then removed from the test pieces, and the pieces were rinsed and cleaned in a solution of chromic and phosphoric acids (ASTM Solution No. G1) at 180° F. (82° C.), then baked for thirty minutes at 250° F. (121° C.) to remove retained water.

Each piece was then pressurized with air at 20 psig (13.8 newtons/cm$^2$) under water and the number of perforations detected by visual observation of streams of bubbles. The number of perforations per piece is shown in Table 1.4 as a function of the degree of post-braze treatment and the degree of exposure to the corrosion solution:

TABLE 1.4

| PERFORATION TEST RESULTS | | |
|---|---|---|
| Post-braze Treatment (Hours at 350° F.) | Hours Exposure to Corrosion Solution | Number of Perforations |
| 0 | 48 | 15+* |
| 4 | 48 | 25+* |
| 8 | 48 | 10 |
| 24 | 48 | 0 |
| 24 | 160 | 7 |
| 74 | 160 | 0 |
| 74 | 600 | 2 |

*Where the perforations were either so numerous or so large as to make counting uncertain, an estimate was made and a "+" sign placed next to the number.

Summarizing Table 1.4, post-braze treatments of 8 hours and above produced consistent reductions of the number of leaks within any given number of hours of corrosion exposure.

EXAMPLE 2

The procedures of Example 1 were repeated, using the same materials, with the exception that the temperature in the post-braze thermal treatment was varied between 250° F. (121° C.) and 550° F. (288° C.). The results are shown in Table 2.1.

TABLE 2.1

| BLISTER AND PERFORATION TEST RESULTS | | | | |
|---|---|---|---|---|
| Post-Braze Treatment | | Hours to First Blister | Total Hours Of Exposure | Number Of Perforations |
| Temperature | Time | | | |
| — | 0 | 48 | 48 | 15+ |
| 250° F. | 24 h | 24 | 48 | 19+ |
| | 72 h | 24 | 48 | 10+ |
| | 100 days | 144 | 144 | 2 |
| 350° F. | 24 h | 144 | 168 | 2 |
| | 72 h | 216 | 264 | 1 |
| 450° F. | 0.5 h | 48 | 48 | 20+ |

TABLE 2.1-continued

BLISTER AND PERFORATION TEST RESULTS

| Post-Braze Treatment | | Hours to First | Total Hours Of | Number Of |
|---|---|---|---|---|
| Temperature | Time | Blister | Exposure | Perforations |
|  | 1.5 h | 24 | 48 | 17+ |
|  | 24 h | 216 | 264 | 2 |
|  | 72 h | 240 | 264 | 1 |
| 500° F. | 0.1 h | 48 | 48 | 15+ |
|  | 0.3 h | 48 | 48 | 14+ |
|  | 24 h | 216 | 264 | 2 |
|  | 72 h | —* | 1108 | 0 |
| 550° F. | 1 min | 24 | 48 | 9+ |
|  | 6 min | 48 | 48 | 4+ |
|  | 24 h | —* | 1108 | 3 |
|  | 72 h | —* | 1108 | 2 |

*No blisters observed over entire duration of test.

Summarizing Table 2.1, there is essentially no improvement obtained from post-braze treatments of 24 and 72 hours at 250° F. when compared to the untreated (i.e., as-brazed) sample which is the first entry. Significant effects are seen at higher temperatures, however. For example, a 24-hour treatment at 350° F. was equal in effectiveness to a 100-day treatment at 250° F. Among the 350° F. tests, an extension of the treatment time from 24 to 72 hours produced a further improvement, while equivalent improvements were achieved in 24 hours at 450° F. and 500° F. Further extension to 72 hours at 500° F. produced an even larger improvement, which was obtained in only 24 hours at 550° F. Thus, over the temperature range investigated, equivalent improvements occur in shorter times at higher temperatures.

EXAMPLE 3

Two vacuum brazed automotive radiators formed from the following core and brazing alloys were selected for testing:

TABLE 3.1

RADIATOR MATERIALS

| | Radiator A | | Radiator B | |
|---|---|---|---|---|
| Element | Core | Cladding | Core | Cladding |
| Si | .21 | 9.6 | .14 | 11.7 |
| Fe | .55 | .4 | .49 | .3 |
| Cu | .15 | .16 | .10 | .05 |
| Mn | 1.18 | .08 | 1.12 | .01 |
| Mg | .01 | 1.45 | .56 | .19 |
| Zn | .08 | .15 | .07 | .02 |
| Ti | .02 | — | .01 | .03 |
| Al | balance | balance | balance | balance |

Test sections were cut from each radiator, each about 6 inches (15.2 cm) long and containing four tubes with intervening air centers. Reserving one section of each type as controls, the remaining sections were subjected to a post-braze heat treatment at 350° F. (177° C.) at atmospheric pressure for 88 hours.

The ends of the tubes were sealed off for the corrosion test, which consisted of exposing the samples to a corrosion solution as in Example 1 for preselected periods of time. After exposure of the samples, the plugs were removed and the samples were cleaned and dried as in Example 1. The two interior tubes in each sample were submerged and pressurized with air at 20 psig and perforation observations were made as before. The results are shown in Table 3.2.

TABLE 3.2

PERFORATION TEST RESULTS

| | Hours Exposure to | Number of Perforations | |
|---|---|---|---|
| | Corrosion Solution | Tube 1 | Tube 2 |
| Radiator A | | | |
| As Brazed | 144 | 25+ | 25+ |
|  | 264 | 12+ | 12+ |
| Thermally | 144 | 0 | 0 |
| Treated | 264 | 0 | 0 |
| 350° F./88 hrs | 408 | 2 | 3 |
|  | 600 | 5 | 4 |
| Radiator B | | | |
| As Brazed | 264 | 25+ | 25+ |
| Thermally | 264 | 0 | 0 |
| Treated | 408 | 1 | 0 |
| 350° F./88 hrs | 600 | 0 | 0 |
|  | 1008 | 2 | 0 |

Summarizing Table 3.2, major improvements in corrosion resistance are shown in all thermally treated samples, even with four times the exposure to the corrosion solution.

EXAMPLE 4

The procedures of Example 1 were again repeated, using the same materials but at temperatures of 550° F. (288° C.) and 650° F. (343° C.) while varying the treatment time further. The results are shown in Table 4.1, which presents data from two samples for each set of conditions.

TABLE 4.1

BLISTER AND PERFORATION TEST RESULTS

| Post-Braze Treatment | | Hours to | Total Hours Of | Number Of |
|---|---|---|---|---|
| Temperature | Time | First Blister | Exposure | Perforations |
| 550° F. | 24 h | — | 1008 | 0 |
|  |  | — | 1008 | 0 |
| 550° F. | 16 h | — | 1008 | 0 |
|  |  | — | 1008 | 0 |
| 550° F. | 8 h | — | 1008 | 0 |
|  |  | — | 1008 | 0 |
| 550° F. | 4 h | — | 1008 | 0 |
|  |  | — | 1008 | 0 |
| 550° F. | 2 h | 336 | 336 | 1 |
|  |  | — | 1008 | 0 |
| 550° F. | 1 h | 168 | 168 | 4 |
|  |  | 216 | 216 | 1 |
| 550° F. | 0.5 h | 168 | 168 | 2 |
|  |  | 192 | 192 | 2 |
| 650° F. | 1 h | 528 | 528 | 2 |
|  |  | 504 | 504 | 2 |

Summarizing this table and comparing to the first entry in Table 2.1, improvements in corrosion resistance occur with treatments at 550° F. lasting as little as 0.5 hour, although further improvement occurs with longer treatment times.

EXAMPLE 5

The procedures of Example 1 were again repeated with the same materials, this time raising the treatment temperature even further to show a loss of improvement at high temperatures. The results are listed in Table 5.1, again showing data from two samples for each set of conditions.

TABLE 5.1

BLISTER AND PERFORATION TEST RESULTS

| Post-Braze Treatment | | Hours to First Blister | Total Hours Of Exposure | Number Of Perforations |
|---|---|---|---|---|
| Temperature | Time | | | |
| 650° F. | 25 h | 240 | 288 | 2 |
| | | 456 | 456 | 1 |
| | 50 h | 672 | 672 | 2 |
| | | 720 | 792 | 4 |
| | 75 h | 312 | 336 | 1 |
| | | 648 | 672 | 1 |
| 700° F. | 25 h | 288 | 288 | 0 |
| | | 432 | 456 | 1 |
| | 50 h | 384 | 384 | 1 |
| | | 336 | 336 | 1 |
| | 75 h | 356 | 384 | 3 |
| | | 288 | 288 | 1 |
| 750° F. | 25 h | 288 | 288 | 3 |
| | | 312 | 336 | 3 |
| | 50 h | 336 | 336 | 1 |
| | | 288 | 288 | 1 |
| | 75 h | 216 | 216 | 3 |
| | | 264 | 288 | 3 |
| 800° F. | 25 h | 192 | 192 | 4 |
| | | 192 | 192 | 3 |
| | 50 h | 216 | 216 | 5 |
| | | 144 | 144 | 1 |
| | 75 h | 120 | 120 | 1 |
| | | 216 | 216 | 8 |
| 850° F. | 25 h | 96 | 120 | 20 |
| | | 48 | 120 | 20 |
| | 50 h | 48 | 48 | 20 |
| | | 72 | 120 | 20 |
| | 75 h | 48 | 48 | 20 |
| | | 48 | 120 | 20 |
| 900° F. | 25 h | 48 | 48 | 20 |
| | | 96 | 120 | 20 |
| | 50 h | 48 | 48 | 20 |
| | | 72 | 120 | 20 |
| 1000° F. | 25 h | 48 | 48 | 0 |
| | | 120 | 144 | 10 |
| | 50 h | 120 | 144 | 15 |
| | | 120 | 288 | 0 |
| 1050° F. | 25 h | 120 | 216 | 6 |
| | | 120 | 216 | 12 |
| | 50 h | 120 | 144 | 15 |
| | | 192 | 288 | 0 |
| | | 144 | 144 | 20 |
| | | 288 | 288 | 0 |

Summarizing this table and again comparing to the first entry in Table 2.1, a loss of effectiveness is seen at treatment temperatures of 850° F. (454° C.) and above.

EXAMPLE 6

This example demonstrates the effect achieved by inserting an intermediate cooling step between the brazing and heat treatment steps. In Table 6.1 below, the heat treatment was performed without an intermediate cooling, by merely placing the samples in a chamber at the temperature shown, for the duration shown, immediately after removal from the brazing furnace. The materials and all other procedures were the same as in Example 1.

TABLE 6.1

POST-BRAZE HEAT TREATENT WITHOUT INTERMEDIATE COOLING - BLISTER AND PERFORATION TEST RESULTS

| Post-Braze Treatment | | Hours to 1st Blister | | [Hrs Exp]/[# Perfs]* | |
|---|---|---|---|---|---|
| | | Sample: | | | |
| Temperature | Time | 1 | 2 | 1 | 2 |
| 800° F. | 25 min | 48 | 48 | 48/20 | 48/20 |
| | 50 | 72 | 72 | 72/4 | 72/4 |
| 750° F. | 25 | 48 | 48 | 48/20 | 48/20 |
| | 50 | 48 | 48 | 48/4 | 48/6 |
| 700° F. | 25 | 48 | 48 | 48/20 | 48/20 |
| | 50 | 48 | 48 | 48/10 | 48/5 |
| | 75 | 48 | 48 | 48/9 | 48/6 |
| 650° F. | 25 | 48 | 48 | 48/20 | 48/12 |
| | 50 | 72 | 72 | 72/20 | 72/12 |
| | 75 | 48 | 72 | 48/2 | 72/14 |
| 600° F. | 25 | 48 | 48 | 48/10 | 48/7 |
| 500° F. | 50 | 48 | 48 | 48/20 | 48/20 |
| 400° F. | 50 | 48 | 48 | 48/20 | 48/20 |

*I.e., [Total Hours of Exposure]/[Number of Perforations]

In Table 6.2, the samples were cooled between the brazing and heat treatment steps to the temperatures shown, and held there momentarily before being reheated to 650° F. (343° C.) for the corrosion resistance treatment.

TABLE 6.2

POST-BRAZE HEAT TREATMENT WITH INTERMEDIATE COOLING - BLISTER AND PERFORATION TEST RESULTS

| Post-Braze Treatment | | Time At Reheat | | Total | |
|---|---|---|---|---|---|
| Cool-Down Temp. | Reheat Temp. | | Hours To 1st Blister | Hours Of Exp. | No. Of Perfs. |
| 550° F. | 650° F. | 50 h | 96 | 120 | 3 |
| | | | 96 | 120 | 4 |
| 400 | 650 | 50 | 96 | 120 | 6 |
| | | | 120 | 120 | 2 |
| 350 | 650 | 50 | 216 | 216 | 1 |
| | | | 264 | 312 | 3 |
| 300 | 650 | 50 | 264 | 312 | 4 |
| | | | 216 | 216 | 1 |
| 250 | 650 | 50 | 288 | 312 | 2 |
| | | | 288 | 312 | 2 |

Summarizing Tables 6.1 and 6.2, the intermediate cool-down to a temperature of 550° F. or lower followed by reheating to a higher temperature provides a significant improvement in the ultimate corrosion resistance, the improvement increasing as the cool-down temperature is lowered.

The foregoing is intended primarily for purposes of illustration. It will be readily apparent to those skilled in the art that numerous modifications and variations of the procedures and conditions described above may be made without departing from the spirit and scope of the invention.

What is claimed is:

1. A method for improving corrosion resistance in a brazed aluminum-base product which comprises heating said product to a temperature between about 300° F. and about 800° F. for at least about 25 minutes.

2. A method in accordance with claim 1 in which said temperature is between about 450° F. and about 650° F.

3. A method in accordance with claim 1 in which said heating is continued for at least about 2 hours.

4. A method in accordance with claim 1 further comprising cooling said product after brazing to an intermediate temperature below said heating temperature and less than about 550° F. prior to said heating.

5. A method in accordance with claim 1 further comprising cooling said product after brazing to an intermediate temperature below said heating temperature and less than about 350° F. prior to said heating.

6. A method for improving corrosion resistance in a brazed aluminum-base product which comprises cooling said product after brazing to an intermediate temperature of about 550° F. or less, then heating said product to a temperature above said intermediate temperature but below temperatures which cause solution heat treatment for at least about 2 hours.

7. A method for producing a brazed aluminum product having improved resistance to intergranular corrosion, which comprises:
  (a) joining a first aluminum-base material comprising an aluminum-base core material clad with an aluminum-base brazing alloy to a second aluminum-base material by brazing; and
  (b) heating the product of step (a) to a temperature between about 300° F. and about 800° F. for at least about 25 minutes.

8. A method in accordance with claim 7 in which said aluminum-base core material is a non-heat-treatable aluminum-base alloy.

9. A method in accordance with claim 7 in which said aluminum-base core material is an alloy of the Aluminum Association 3xxx series.

10. A method in accordance with claim 7 in which said aluminum-base brazing alloy is a silicon-containing aluminum alloy.

11. A method in accordance with claim 7 in which said aluminum-base brazing alloy is an alloy of the Aluminum Association 4xxx series.

12. A method in accordance with claim 7 in which step (a) is performed by vacuum brazing.

13. A method in accordance with claim 7 in which the temperature in step (b) is between about 450° F. and about 650° F.

14. A method in accordance with claim 7 in which the heating in step (b) is continued for at least about 2 hours.

15. A method in accordance with claim 7 further comprising cooling the product of step (a) prior to step (b) to an intermediate temperature below the temperature of step (b) and less than about 550° F.

16. A method in accordance with claim 7 further comprising cooling the product of step (a) prior to step (b) to an intermediate temperature below the temperature of step (b) and less than about 350° F.

17. A method for producing a brazed aluminum product having improved resistance to intergranular corrosion, which comprises:
  (a) joining a first aluminum-base material comprising an aluminum-base core alloy of the Aluminum Association 3xxx series clad with an aluminum-base brazing alloy of the Aluminum Association 4xxx series to a second aluminum-base material by vacuum brazing;
  (b) cooling the product of step (a) to a temperature of about 550° F. or less; and
  (c) maintaining said product at a temperature between about 300° F. and about 800° F. for at least about 2 hours.

18. A brazed aluminum product formed by:
  (a) joining a first aluminum-base material comprising an aluminum-base core material clad with an aluminum-base brazing alloy to a second aluminum-base material by brazing; and
  (b) heating the product of step (a) to a temperature between about 300° F. and about 800° F. for at least about 25 minutes.

19. A brazed aluminum product in accordance with claim 18 in which said aluminum-base core material is a non-heat-treatable aluminum-base alloy.

20. A brazed aluminum product in accordance with claim 18 in which said aluminum-base core material is an alloy of the Aluminum Association 3xxx series.

21. A brazed aluminum product in accordance with claim 18 in which said aluminum-base brazing alloy is a silicon-containing aluminum alloy.

22. A brazed aluminum product in accordance with claim 18 in which said aluminum-base brazing alloy is an alloy of the Aluminum Association 4xxx series.

23. A brazed aluminum product in accordance with claim 18 in which step (a) is performed by vacuum brazing.

24. A brazed aluminum product in accordance with claim 18 in which the temperature in step (b) is between about 450° F. and about 650° F.

25. A brazed aluminum product in accordance with claim 18 in which the heating in step (b) is continued for at least about 2 hours.

26. A brazed aluminum product in accordance with claim 18 in which the product of step (a) is cooled prior to step (b) to an intermediate temperature below the temperature of step (b) and less than about 550° F.

27. A brazed aluminum product in accordance with claim 18 in which the product of step (a) is cooled prior to step (b) to an intermediate temperature below the temperature of step (b) and less than about 350° F.

28. A brazed aluminum product formed by:
  (a) joining a first aluminum-base material comprising a core alloy of the Aluminum Association 3xxx series clad with a brazing alloy of the Aluminum Association 4xxx series to a second aluminum-base material by vacuum-brazing;
  (b) cooling the product of step (a) to a temperature of about 550° F. or less; and
  (c) maintaining said product at a temperature between about 300° F. and about 800° F. for at least about 2 hours.

* * * * *